US012719616B2

(12) United States Patent
Marcone et al.

(10) Patent No.: US 12,719,616 B2
(45) Date of Patent: Aug. 25, 2026

(54) APPARATUS, METHOD, AND COMPUTER PROGRAM

(71) Applicant: Nokia Technologies Oy, Espoo (FI)

(72) Inventors: Alessio Marcone, Munich (DE); Marco Maso, Issy les Moulineaux (FR); Karri Markus Ranta-Aho, Espoo (FI); Nhat-Quang Nhan, Reims (FR)

(73) Assignee: Nokia Technologies Oy, Espoo (FI)

( * ) Notice: Subject to any disclaimer, the term of this patent is extended or adjusted under 35 U.S.C. 154(b) by 280 days.

(21) Appl. No.: 18/660,308

(22) Filed: May 10, 2024

(65) Prior Publication Data

US 2024/0380524 A1 Nov. 14, 2024

(30) Foreign Application Priority Data

May 12, 2023 (GB) ..................................... 2307063

(51) Int. Cl.

| | |
|---|---|
| ***H04L 1/1812*** | (2023.01) |
| ***H04L 1/1607*** | (2023.01) |
| ***H04L 5/00*** | (2006.01) |
| ***H04W 72/21*** | (2023.01) |

(52) U.S. Cl.

CPC .......... *H04L 1/1816* (2013.01); *H04L 1/1614* (2013.01); *H04L 5/0055* (2013.01); *H04W 72/21* (2023.01)

(58) Field of Classification Search

CPC ... H04L 1/1816; H04L 1/1614; H04L 5/0055; H04L 1/189; H04L 1/1896; H04W 72/21; H04W 72/23; H04W 74/0833

See application file for complete search history.

(56) References Cited

U.S. PATENT DOCUMENTS

| | | | | |
|---|---|---|---|---|
| 12,245,283 | B2 * | 3/2025 | Taherzadeh Boroujeni | H04L 1/189 |
| 12,418,898 | B2 * | 9/2025 | Cozzo | H04L 5/0048 |
| 2018/0090360 | A1 * | 3/2018 | Miyamoto | H10P 72/50 |
| 2022/0256617 | A1 * | 8/2022 | Mu | H04W 72/1263 |

(Continued)

FOREIGN PATENT DOCUMENTS

| | | | |
|---|---|---|---|
| WO | 2021/119978 | A1 | 6/2021 |
| WO | 2022/078441 | A1 | 4/2022 |
| WO | 2022/081732 | A1 | 4/2022 |

(Continued)

OTHER PUBLICATIONS

Extended European Search Report received for corresponding European Patent Application No. 24175511.5, dated Oct. 10, 2024, 7 pages.

(Continued)

*Primary Examiner* — Abdullahi E Salad

(74) *Attorney, Agent, or Firm* — Barta Jones, PLLC

(57) ABSTRACT

The disclosure relates to an apparatus configured to: transmit, to a base station, uplink control information indicating successful completion of a random access procedure and a capability or request to perform a physical uplink shared channel transmission with repetitions following the successful completion of the random access procedure; receive, from the base station, downlink control information scheduling the physical uplink shared channel transmission with repetitions; and perform (904) the physical uplink shared channel transmission with repetitions.

20 Claims, 11 Drawing Sheets

(56) References Cited

U.S. PATENT DOCUMENTS

2022/0312413 A1* 9/2022 Cozzo .................. H04L 1/0003
2024/0031119 A1* 1/2024 Li ......................... H04L 5/1469

FOREIGN PATENT DOCUMENTS

WO 2022/187051 A1 9/2022
WO 2023/059126 A1 4/2023

OTHER PUBLICATIONS

"On PUSCH repetition type A scheduled by DCI format 0-0 with CRC scrambled by C-RNTI", 3GPP TSG RAN WG1 #112bis-e, R1-2302762, Agenda: 9.16, ZTE, Apr. 17-26, 2023, 7 pages.
"3rd Generation Partnership Project; Technical Specification Group Radio Access Network; NR; Physical layer procedures for control (Release 17)", 3GPP TS 38.213, V17.5.0, Mar. 2023, pp. 1-262.
"3rd Generation Partnership Project; Technical Specification Group Radio Access Network; NR; Physical channels and modulation (Release 17)", 3GPP TS 38.211, V17.4.0, Dec. 2022, pp. 1-136.
"TEI proposals for Rel-18", 3GPP TSG RAN WG1 #112, R1-2300811, Agenda: 9.17, ZTE, Feb. 27-Mar. 3, 2023, pp. 1-9.
Search Report received for corresponding United Kingdom Patent Application No. 2307063.4, dated Oct. 27, 2023, 2 pages.

* cited by examiner

APPARATUS, METHOD, AND COMPUTER PROGRAM

RELATED APPLICATION

This application claims priority to, and benefit of, GB Application No. 2307063.4, filed on May 12, 2023, the contents of which is incorporated herein by reference in its entirety.

FIELD OF THE DISCLOSURE

The present disclosure relates to an apparatus, a method, and a computer program for performing a physical uplink shared channel transmission with repetitions in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising at least one processor and at least one memory storing instructions that, when executed by the at least one processor, cause the apparatus at least to: transmit, to a base station, uplink control information indicating successful completion of a random access procedure and a capability or request to perform a physical uplink shared channel transmission with repetitions following the successful completion of the random access procedure; receive, from the base station, downlink control information scheduling the physical uplink shared channel transmission with repetitions; and perform the physical uplink shared channel transmission with repetitions.

The uplink control information may be generated and transmitted in response to receiving, from the base station, a message 4 of a four-step random access procedure or a message B of a two-step random access procedure.

The downlink control information scheduling physical uplink shared channel transmission with repetitions may comprise downlink control information format 0_0 with a cyclic redundancy check scrambled by at least one of: a cell radio network temporary identifier; a configured scheduling radio network temporary identifier; or a modulation and coding scheme cell radio network temporary identifier.

The physical uplink shared channel transmission with repetitions may convey at least one of: a radio resource control setup complete message; a capability information message; or an uplink data message.

The uplink control information may comprise a hybrid automatic repeat request acknowledgement bit set to indicate both successful completion of the random access procedure and a capability or request to perform a physical uplink shared channel transmission with repetitions following the successful completion of the random access procedure.

The hybrid automatic repeat request acknowledgement bit may be set to value 'zero'.

The uplink control information may be transmitted using a physical uplink control channel format 1.

The hybrid automatic repeat request acknowledgement bit may be modulated using a specific binary phase shift keying symbol.

The uplink control information may be transmitted using a physical uplink control channel format 0.

The hybrid automatic repeat request acknowledgement bit may be indicated using a specific sequence cyclic shift.

The uplink control information may comprise: a hybrid automatic repeat request acknowledgement bit set to indicate a match between a contention resolution identifier received from the base station and a contention resolution identifier transmitted by the apparatus; and another bit set to indicate a capability or request to perform a physical uplink shared channel transmission with repetitions following the successful completion of the random access procedure.

The hybrid automatic repeat request acknowledgement bit may be set to value 'one'.

The hybrid automatic repeat request acknowledgement bit and the other bit may be multiplexed.

The uplink control information may be transmitted using a physical uplink control channel format 1.

The hybrid automatic repeat request acknowledgement bit and the other bit may be modulated using a specific quadrature phase shift key symbol.

The uplink control information may be transmitted using a physical uplink control channel format 0.

The hybrid automatic repeat request acknowledgement bit and the other bit may be indicated using a specific sequence cyclic shift.

The hybrid automatic repeat request acknowledgement bit and the other bit may be transmitted using a quadrature phase shift key symbol with a largest Euclidian distance from a binary phase shift key symbol corresponding to a value 'one'.

The uplink control information may be transmitted using a physical uplink control channel format 1 with repetitions and may comprise: a hybrid automatic repeat request acknowledgement bit set to indicate a match between a contention resolution identifier received from the base station and a contention resolution identifier transmitted by the apparatus and modulated into $\alpha$ complex-valued symbol d(0) conveyed in a physical uplink control channel transmission with repetitions; and wherein a capability or request to perform a physical uplink shared channel transmission with repetitions following the successful completion of the random access procedure may be indicated using a specific pattern for the complex-valued symbol d(0) throughout the physical uplink control channel transmission with repetitions.

The specific pattern for the complex-valued symbol d(0) may comprise an alternating pattern.

The uplink control information may be transmitted using a physical uplink control channel format 0 with repetitions and may comprise: a hybrid automatic repeat request acknowledgement bit set to indicate a match between a contention resolution identifier received from the base station and a contention resolution identifier transmitted by the apparatus and mapped into a specific sequence cyclic shift conveyed in a physical uplink control channel transmission with repetitions; and wherein a capability or request to perform a physical uplink shared channel transmission with repetitions following the successful completion of the random access procedure may be indicated using a specific pattern for the specific sequence cyclic shift throughout the physical uplink control channel transmission with repetitions.

Scheduling physical uplink shared channel transmission with repetitions may comprise indicating a number of repetitions.

The apparatus may be a user equipment.

According to an aspect there is provided an apparatus comprising means for: transmitting, to a base station, uplink control information indicating successful completion of a random access procedure and a capability or request to perform a physical uplink shared channel transmission with repetitions following the successful completion of the random access procedure; receiving, from the base station, downlink control information scheduling the physical uplink shared channel transmission with repetitions; and performing the physical uplink shared channel transmission with repetitions.

According to an aspect there is provided an apparatus comprising circuitry configured to: transmit, to a base station, uplink control information indicating successful completion of a random access procedure and a capability or request to perform a physical uplink shared channel transmission with repetitions following the successful completion of the random access procedure; receive, from the base station, downlink control information scheduling the physical uplink shared channel transmission with repetitions; and perform the physical uplink shared channel transmission with repetitions.

According to an aspect there is provided a method comprising: transmitting, to a base station, uplink control information indicating successful completion of a random access procedure and a capability or request to perform a physical uplink shared channel transmission with repetitions following the successful completion of the random access procedure; receiving, from the base station, downlink control information scheduling the physical uplink shared channel transmission with repetitions; and performing the physical uplink shared channel transmission with repetitions.

According to an aspect there is provided a computer program comprising computer executable code which when run on at least one processor is configured to: transmit, to a base station, uplink control information indicating successful completion of a random access procedure and a capability or request to perform a physical uplink shared channel transmission with repetitions following the successful completion of the random access procedure; receive, from the base station, downlink control information scheduling the physical uplink shared channel transmission with repetitions; and perform the physical uplink shared channel transmission with repetitions.

According to an aspect there is provided an apparatus comprising at least one processor and at least one memory storing instructions that, when executed by the at least one processor, cause the apparatus at least to: receive, from a user equipment, uplink control information indicating a successful completion of a random access procedure and a capability or request to perform a physical uplink shared channel transmission with repetitions following the successful completion of the random access procedure; transmit, to the user equipment, downlink control information scheduling the physical uplink shared channel transmission with repetitions; and receive, from the user equipment, the physical uplink shared channel transmission with repetitions.

The uplink control information may be received in response to transmitting, to the user equipment, a message 4 of a 4-step random access procedure or a message B of a 2-step random access procedure.

The downlink control information scheduling physical uplink shared channel transmission with repetitions may comprise downlink control information format 0_0 with a cyclic redundancy check scrambled by at least one of: a cell radio network temporary identifier; a configured scheduling radio network temporary identifier; or a modulation and coding scheme cell radio network temporary identifier.

The physical uplink shared channel transmission with repetitions may convey at least one of: a radio resource control setup complete message; a capability information message; or an uplink data message.

The apparatus may be a base station.

According to an aspect there is provided an apparatus comprising means for: receiving, from a user equipment, uplink control information indicating a successful completion of a random access procedure and a capability or request to perform a physical uplink shared channel transmission with repetitions following the successful completion of the random access procedure; transmitting, to the user equipment, downlink control information scheduling the physical uplink shared channel transmission with repetitions; and receiving, from the user equipment, the physical uplink shared channel transmission with repetitions.

According to an aspect there is provided an apparatus comprising circuitry configured to: receive, from a user equipment, uplink control information indicating a successful completion of a random access procedure and a capability or request to perform a physical uplink shared channel transmission with repetitions following the successful completion of the random access procedure; transmit, to the user equipment, downlink control information scheduling the physical uplink shared channel transmission with repetitions; and receive, from the user equipment, the physical uplink shared channel transmission with repetitions.

According to an aspect there is provided a method comprising: receiving, from a user equipment, uplink control information indicating a successful completion of a random access procedure and a capability or request to perform a physical uplink shared channel transmission with repetitions following the successful completion of the random access procedure; transmitting, to the user equipment, downlink control information scheduling the physical uplink shared channel transmission with repetitions; and receiving, from the user equipment, the physical uplink shared channel transmission with repetitions.

According to an aspect there is provided a computer program comprising computer executable code which when run on at least one processor is configured to: receive, from a user equipment, uplink control information indicating a successful completion of a random access procedure and a capability or request to perform a physical uplink shared channel transmission with repetitions following the successful completion of the random access procedure; transmit, to the user equipment, downlink control information scheduling the physical uplink shared channel transmission with repetitions; and receive, from the user equipment, the physical uplink shared channel transmission with repetitions.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

ACK: Acknowledgement
AF: Application Function
AMF: Access and Mobility Management Function
API: Application Programming Interface
BPSK: Binary Phase Shift Keying
BS: Base Station
CBRA: Contention Based Random Access
CG: Configured Grant
CRC: Cycling Redundancy Check
C-RNTI: Cell Radio Network Identifier
CSI: Channel State Information
CS-RNTI: Configured Scheduled Radio Network Identifier
CU: Centralized Unit
DL: Downlink
DU: Distributed Unit
gNB: gNodeB
GSM: Global System for Mobile communication
HARQ: Hybrid Automatic Repeat Request
HSS: Home Subscriber Server
IoT: Internet of Things
LSB: Least Significant Bit
LTE: Long Term Evolution
MAC: Medium Access Control
MS: Mobile Station
MCS: Modulation and control scheme
MIB: Master Information Block
MSB: Most Significant Bit
Msg 1: Message 1
Msg 2: Message 2
Msg 3: Message 3
Msg 4: Message 4
MTC: Machine Type Communication
NEF: Network Exposure Function
NF: Network Function
NR: New radio
NRF: Network Repository Function
OFDM: Orthogonal Frequency Division Multiplexing
PAPR: Peak to Average Power Ratio
PBCH: Physical Broadcast Channel
PDU: Packet Data Unit
PDCCH: Physical Downlink Control Channel
PDSCH: Physical Downlink Shared Channel
PRACH: Physical Random Access Channel
PRB: Physical Resource Block
PRI: Physical Resource Indicator
PUCCH: Physical Uplink Control Channel
PUSCH: Physical Shared Control Channel
RACH: Random Access Channel
QPSK: Quadrature Phase Shift Keying
RAM: Random Access Memory
(R)AN: (Radio) Access Network
RAR: Random Access Response
RE: Resource Element
RNTI: Radio Network Temporary Identifier
RO: Random Access Channel Occasion
ROM: Read Only Memory
RRC: Radio Resource Control
RV: Redundancy Version
SIB: System Information Block
SMF: Session Management Function
SR: Scheduling Request
SSB: Synchronization Signal Block
TB: Transport Block
TBS: Transport Block Size
TC-RNTI: Temporary Cell Radio Network Identifier
TDD: Time Division Duplex
TR: Technical Report
TS: Technical Specification
UCI: Uplink Control Information
UE: User Equipment
UL: Uplink
UMTS: Universal Mobile Telecommunication System
URLLC: Ultra Reliable Low Latency Communications
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
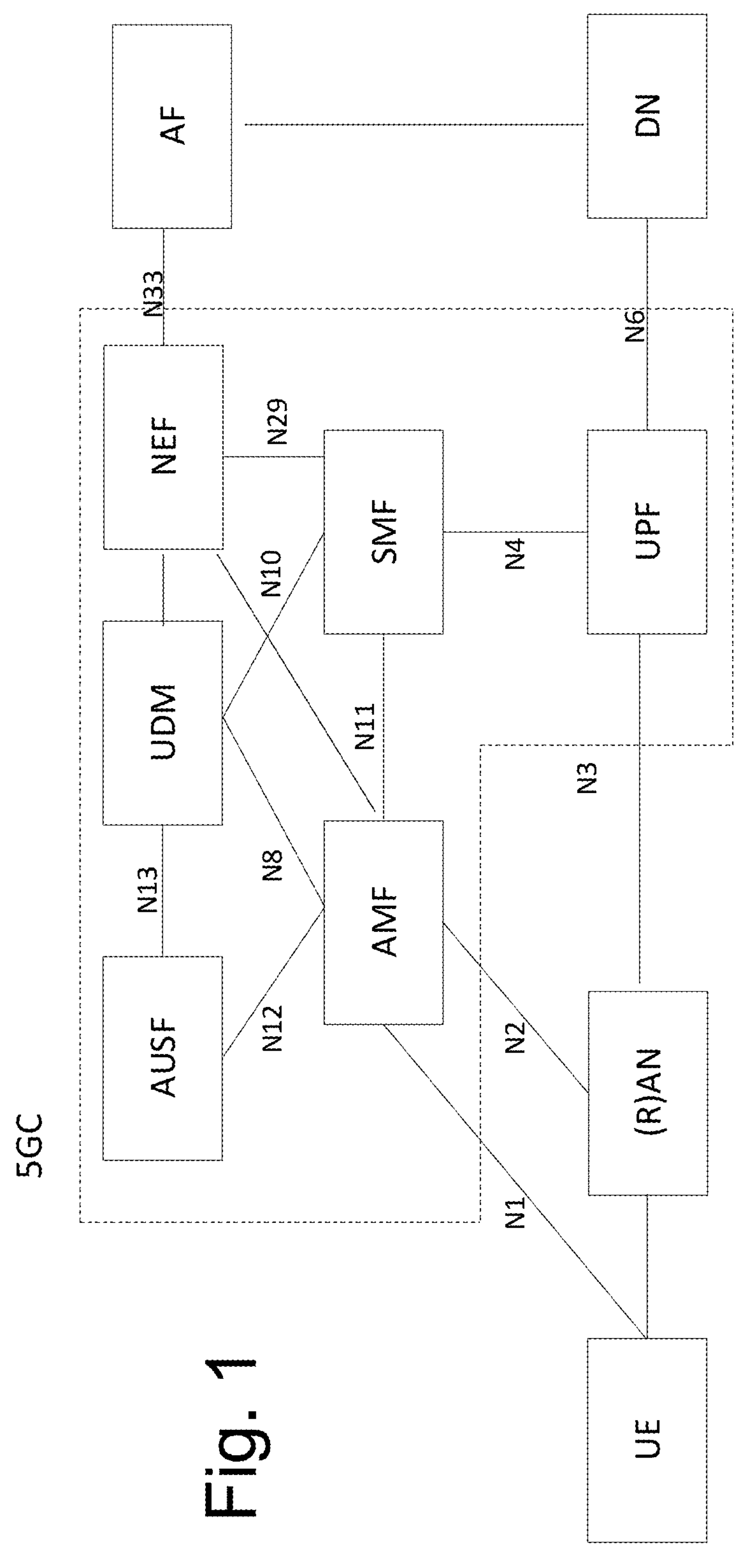
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
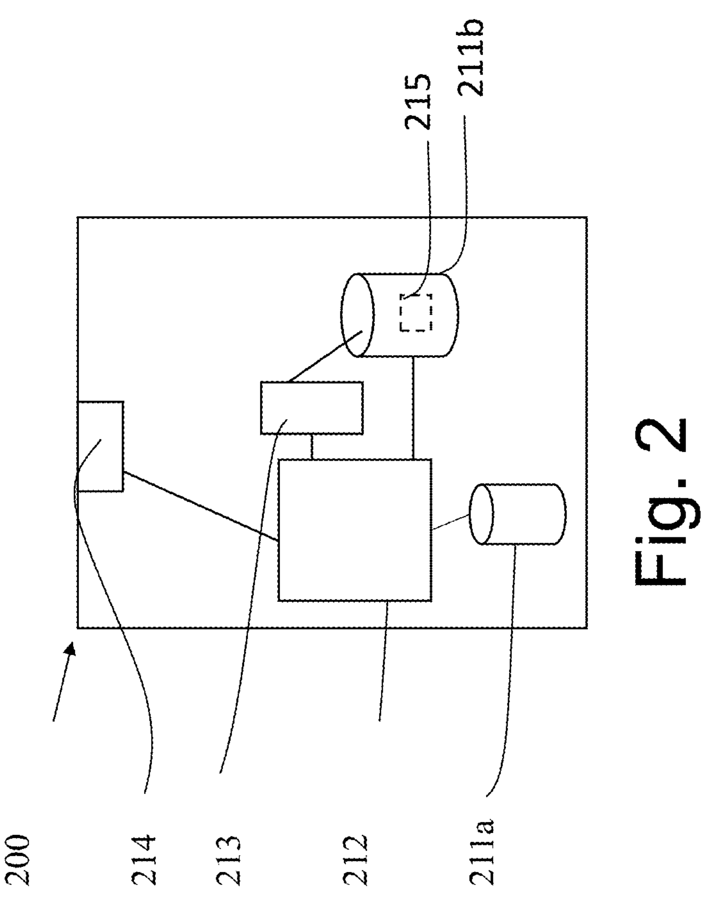
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
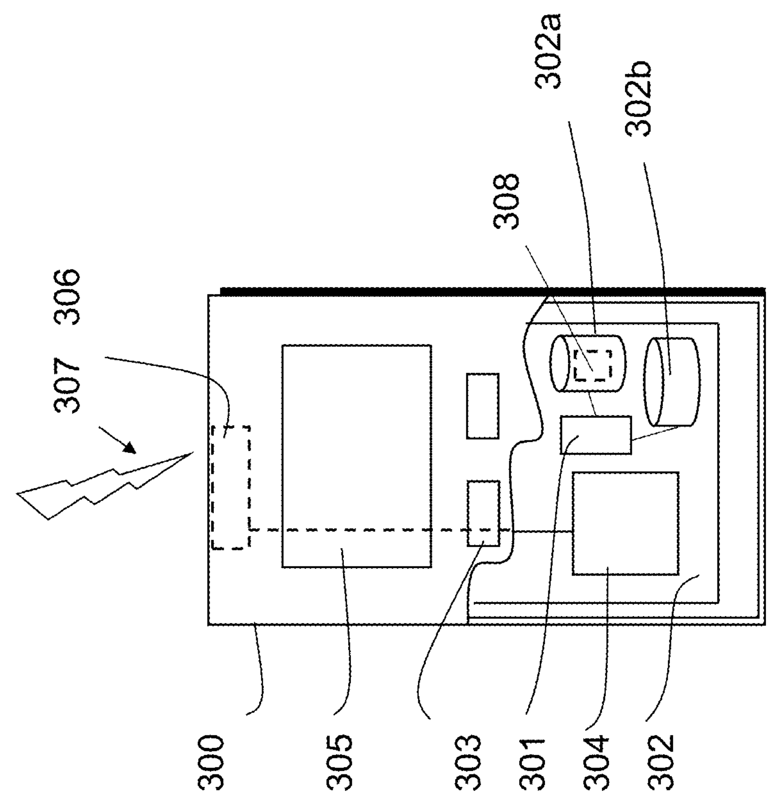
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Release 15 introduces a slot aggregation feature for physical uplink shared channel (PUSCH) known as PUSCH repetition type A. In this feature, a PUSCH transmission conveying transport block (TB) may be repeated in repetitions. Each repetition may be implemented in a different slot.

The same resource allocation may be applied across the repetitions.

In the time domain, the repetitions may use a same start (i.e. starting OFDM symbol) and length (i.e. number of OFDM symbols). The single start and length may be indicated by the BS to a UE via a single start and length indicator value (SLIV).

The number of repetitions may be semi-statically configured, for example via radio resource control signalling. The number of repetitions may be counted on consecutive slots as illustrated in FIG. 4.

Figure 4:
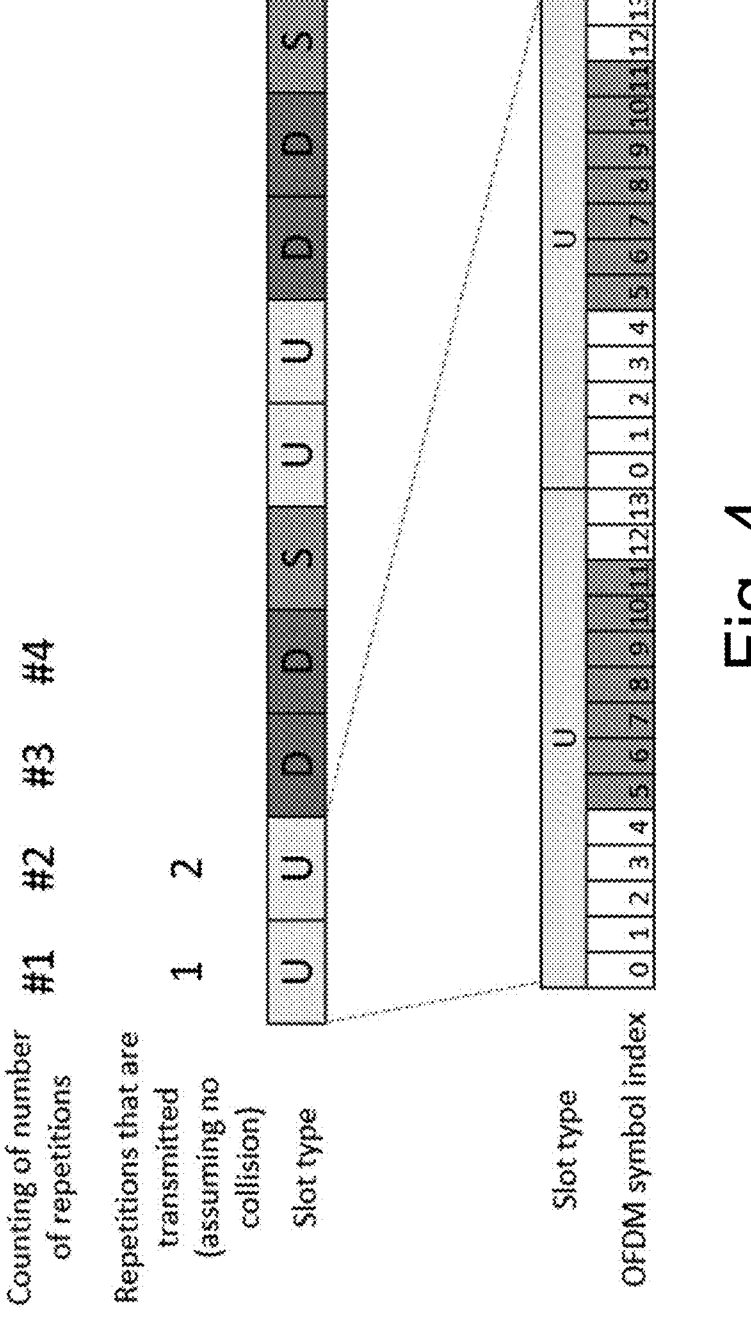
FIG. 4 shows a schematic representation of an implementation of a physical uplink shared channel repetition type A in Release 15 with four repetitions, a start equal to 5, a length equal to 7 and a DDSUU (10D:2G:2U) time division duplex pattern.

FIG. 4 shows a schematic representation of an implementation of a PUSCH repetition type A in Release 15 with four repetitions, a start may be equal to 5, a length may be equal to 7 and a DDSUU (wherein the S slot may be composed by 10D:2G:2U symbols, where D may stand for downlink symbols, G may stand for guard symbols and U may stand for uplink symbols) time division duplex (TDD) pattern.

If the number of available symbols in a slot is not sufficient (i.e. lower than the length), the repetition may not transmitted in the slot.

In the frequency domain, the repetitions may use a same number of physical resource blocks (PRBs) and a same location of these PRBs.

An unquantized intermediate variable ($N_{info}$) for the calculation of the TB size (TBS) may be calculated based on a number of resource elements (REs) in a slot.

The repetitions may use a same or different redundancy version (RV) of encoded bits in circular buffer. RV for a first repetition may be indicated via downlink control information (DCI) for dynamic grant or may be preconfigured for configured grant. If different RVs are used, RVs are cycled from a configured RV sequence, following an indicated RV for the first repetition. There may be four RVs. Each RV may provide information on the starting encoded bit from a circular buffer that a UE should map to a PUSCH transmission associated with the RV, as illustrated in FIG. 5.

Figure 5:
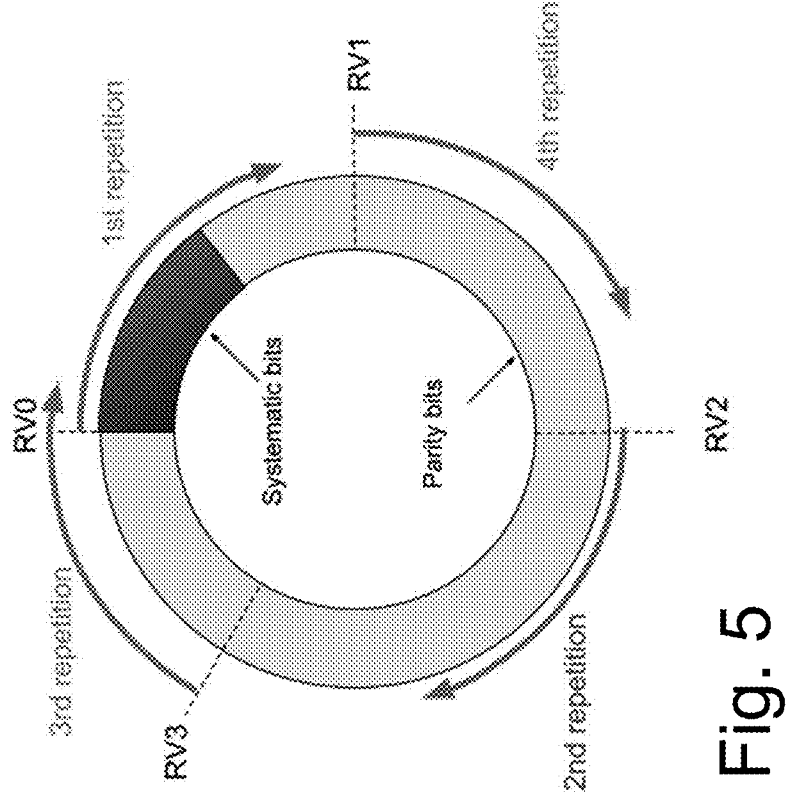
FIG. 5 shows a schematic representation of a bit selection mechanism for physical uplink shared channel repetition type A with redundancy version cycling.

FIG. 5 shows a schematic representation of a bit selection mechanism for PUSCH repetition type A with RV cycling.

Release 16 allows to dynamically indicate a number of repetitions for PUSCH repetition type A by associating the number of repetitions to each row of a time domain resource assignment table.

Release 16 also introduces PUSCH repetition type B for ultra-reliable low latency communications (URLLC) applications. A single SLIV may be used for determining multiple back-to-back nominal repetitions with the same length and each nominal repetition may span across the slot boundary. Then, each nominal repetition may be split into multiple actual repetitions if the nominal repetition crosses the slots boundary or invalid symbols. The repetitions in PUSCH repetition type B may also have the same frequency domain resource allocation.

Figure 6:
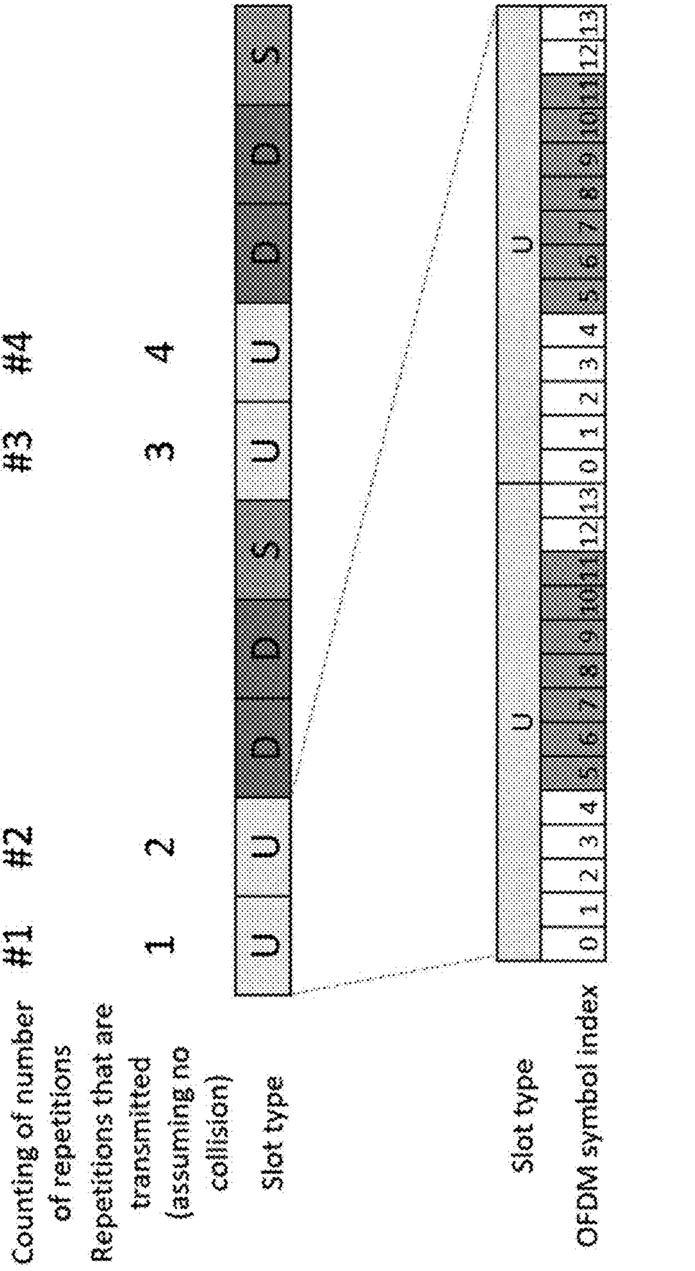
FIG. 6 shows a schematic representation of an implementation of a physical uplink shared channel repetition type A in Release 17 with four repetitions, a start equal to 5, a length equal to 7 and a DDSUU (10D:2G:2U) time division duplex pattern.

Release 17 further improves PUSCH repetition type A by allowing the number of repetitions to be counted on available slots (i.e. only on the slots that are available for the transmissions of the repetitions) as illustrated in FIG. 6.

FIG. 6 shows a schematic representation of an implementation of a PUSCH repetition type A in Release 17 with four repetitions, a start may be equal to 5, a length may be equal to 7 and a DDSUU (10D:2G:2U) time division duplex (TDD) pattern.

Release 17 also increases the maximum number of repetitions from 16 to 32 for PUSCH repetition type A. It may be worth noting that the above features are applied for PUSCH transmissions scheduled by DCI format 0_1 or by DCI format 0_2.

A radio network temporary identifier (RNTI) may be used to scramble cyclic redundancy check (CRC) bits of a DCI payload conveyed over a physical downlink control channel (PDCCH). Different RNTIs may used for different purposes.

A cell RNTI (C-RNTI) may be used when scheduling physical downlink shared channel (PDSCH) or PUSCH resources to a UE.

A temporary C-RNTI (TC-RNTI) may be used when scheduling PUSCH resources for a Msg3 transmission of a random access channel (RACH) procedure. It is also used when scheduling PDSCH resources for a Msg4 transmission of a RACH procedure.

A configured scheduling RNTI (CS-RNTI) may be used to activate or deactivate a configured grant (CG) transmission in UL or semi-persistent scheduling (SPS) in DL. It may also be used when scheduling a repetition of the CG transmission or SPS transmission.

A modulation and coding scheme C-RNTI (MCS-C-RNTI) may be used to switch between the MCS tables applied to the scheduled PUSCH or PDSCH. Low spectral efficiency MCS table may be used if DCI is scrambled with MCS-C-RNTI.

In 5G NR two contention based random access (CBRA) procedures may be supported, namely a four-step RACH procedure (specified in Release 15) and a two-step RACH procedure (specified in Release 16).

Figure 7:
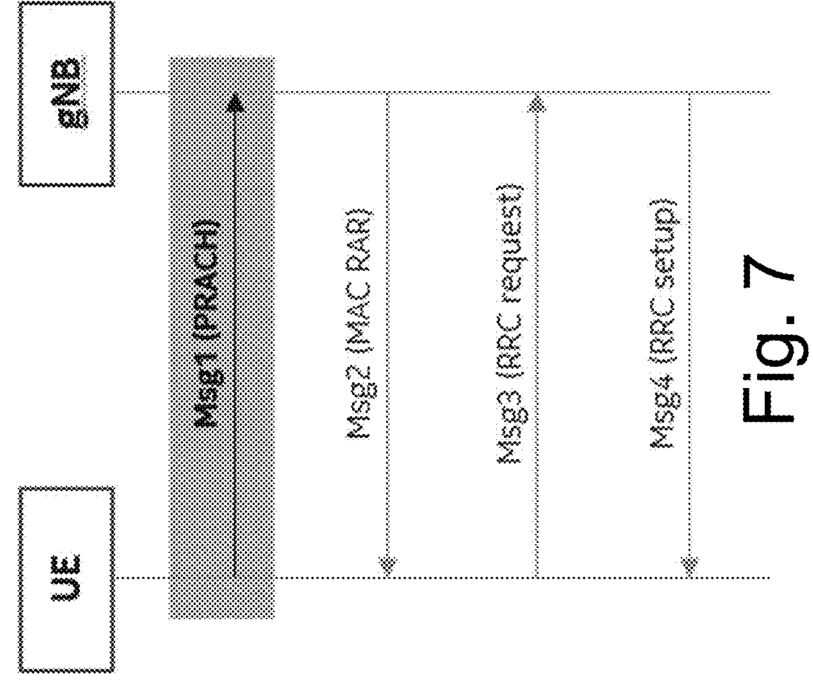
FIG. 7 shows a signalling diagram of a four-step random access procedure.

FIG. 7 shows a signalling diagram of a four-step random access procedure;

A UE may transmit a Msg1 (a.k.a. PRACH) to a BS. Msg1 may comprise a specific preamble transmitted by the UE to the BS via a physical random-access channel (PRACH) using a specific resource called RACH occasion (RO).

The BS may transmit a Msg2 to the UE. Msg2 may comprise a random-access response (RAR) including a detected preamble identifier, a time-advance command, a TC-RNTI, and an UL grant for the transmission of Msg3 on PUSCH.

The UE may transmit a Msg3 (a.k.a. RRC request) to the BS. Msg3 may comprise a contention resolution identifier.

The BS may transmit a Msg4 (a.k.a. RRC setup) to the UE. Msg4 may comprise the contention resolution identifier received from the UE.

Upon receiving Msg4, the UE may transmit a one bit HARQ-ACK set to '1' on a PUCCH if the contention resolution identifier conveyed by Msg4 matches the contention resolution identifier conveyed by Msg3. This completes the four-step RACH.

It may be worth noting that prior to Msg1, there may be a preliminary step of transmitting by the BS to the UE a synchronization signal block (SSB) (i.e. DL beam sweeping), which is not formally part of the RACH procedure. As a result of this preliminary step, the UE may select an index of a preferred SSB beam and may decode an associated physical broadcast (PBCH) for master information block (MIB) or system information block (SIB). The index may be used by UE to identify a suitable RO for the preamble transmission (Msg1) according to the SSB-to-RO mapping conveyed by SIB1. The BS may use the preferred SSB beam to transmit Msg2 to UE.

The two-step RACH procedure may be similar to the four-step RACH procedure but Msg1 and Msg3 may be combined into a MsgA and may be transmitted without waiting for feedback from the BS in between (Msg2). Similarly, Msg2 and Msg4 may be combined into into MsgB.

After the UE completes the four-step RACH procedure, the BS may schedule the UE to transmit an RRC setup complete message (sometimes referred to as Msg5). After receiving the RRC setup complete message, the BS may transmit a request to receive a UE capability information message from the UE. The UE may transmit the UE capability information message. The BS may then perform a RRC reconfiguration according to the UE capability information included in the UE capability information message. The UE capability information message may indicate a capability to perform PUSCH transmissions with repetitions when the UE is in RRC connected mode. The UE capability information message may further indicate that the capability to perform PUSCH transmissions with repetitions when the UE is in RRC connected mode is applied when the PUSCH transmissions with repetitions is scheduled with DCI format 0_0 with CRC scrambled by C-RNTI, CS-RNTI or MCS-C-RNTI.

Release 17 introduces repetitions for Msg3 transmissions over PUSCH in form of PUSCH repetition type A counted on available slots. Msg3 initial transmission and Msg3 retransmission may be scheduled differently. Msg3 initial transmission may be scheduled by MAC RAR in Msg2 while Msg3 retransmission may be scheduled by DCI format 0_0 with CRC scrambled by TC-RNTI. As a result, different approaches may be adopted for indicating a number of repetitions for Msg3 initial transmission and Msg3 retransmissions.

For Msg3 initial transmission, the two MSBs of the MCS information field in the RAR UL grant may provide a codepoint to determine the number of repetitions K according to Table 1.

TABLE 1

Number of repetitions K as a function of two most significant bits (MSBs) of MCS information field in RAR UL grant.

| numberOfMsg3Repetitions is configured | | numberOfMsg3Repetitions is not configured | |
|---|---|---|---|
| Code-point | K | Code-point | K |
| 00 | First value of numberOfMsg3Repetitions | 00 | 1 |
| 01 | Second value of numberOfMsg3Repetitions | 01 | 2 |
| 10 | Third value of numberOfMsg3Repetitions | 10 | 3 |
| 11 | Fourth value of numberOfMsg3Repetitions | 11 | 4 |

If numberOfMsg3-RepetitionsList is configured, the two MSBs point to a list of values configured in numberOfMsg3-RepetitionsList. Otherwise, the two MSBs point to a default list of values from 1 to 4. In this case, given that RAR UL grant has four MCS information field bits, the two LSBs of the MCS information field may be used for indicating an MCS index according to Table 2.

TABLE 2

MCS index as a function of two least significant bits (LSBs) of MCS information field in RAR UL grant.

| mcs-Msg3Repetition is configured | | mcs-Msg3Repetitions is not configured | |
|---|---|---|---|
| Code-point | $I_{MCS}$ | Code-point | $I_{MCS}$ |
| 00 | First value of mcs-Msg3Repetition | 00 | 0 |
| 01 | Second value of mcs-Msg3Repetition | 01 | 1 |
| 10 | Third value of mcs-Msg3Repetition | 10 | 2 |
| 11 | Fourth value of mcs-Msg3Repetition | 11 | 3 |

For Msg3 retransmission, the two MSBs of the MCS information field in DCI format 0_0 scrambled by TC-RNTI may provide a codepoint to determine the number of repetitions K according to Table 1, similar to the case for Msg3 initial transmission. In this case, given that the MCS information field in DCI format 0_0 has 5 bits, the three LSBs of the MCS information field may be used for indicating an MCS index according to Table 3.

TABLE 3

MCS index as a function of three LSBs of MCS information field in DCI format 0_0 scrambled by TC-RNTI.

| mcs-Msg3Repetition is configured | | mcs-Msg3Repetitions is not configured | |
|---|---|---|---|
| Code-point | $I_{MCS}$ | Code-point | $I_{MCS}$ |
| 000 | First value of mcs-Msg3Repetition | 000 | 0 |
| 001 | Second value of mcs-Msg3Repetition | 001 | 1 |
| 010 | Third value of mcs-Msg3Repetition | 010 | 2 |
| 011 | Fourth value of mcs-Msg3Repetition | 011 | 3 |
| 100 | Fifth value of mcs-Msg3Repetition | 100 | 4 |
| 101 | Sixth value of mcs-Msg3Repetition | 101 | 5 |
| 110 | Seventh value of mcs-Msg3Repetition | 110 | 6 |
| 111 | Eighth value of mcs-Msg3Repetition | 111 | 7 |

In summary, current specifications only support repetitions for PUSCH transmissions scheduled by DoI format 0_0 with CRC scrambled by TC-RNTI, such as Msg3 PUSCH retransmissions.

As already mentioned above, upon receiving Msg4 from the BS and determining that Msg4 conveys a contention resolution identifier matching a contention resolution identifier conveyed in Msg3, the UE may transmit a one bit HARQ-ACK set to '1' on PUCCH. This is specified in TS 38.213 which reads as follows.

"In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity [11, TS 38.321]. In response to the PDSCH reception with the UE contention resolution identity, the UE transmits HARQ-ACK information in a PUCCH. The PUCCH transmission is within a same active UL BWP as the PUSCH transmission".

Upon receiving Msg4 from the BS and determining that Msg4 conveys a contention resolution identifier that is not matching a contention resolution identifier conveyed in Msg3 or upon failing to receive Msg4, the UE may not transmit a one bit HARQ-ACK set to '0' on PUCCH. In other words, for the HARQ-ACK feedback of the Msg4 only the value '1' is used for indicating that UE has successfully received Msg4 and determined that the UE contention resolution identifier conveyed by Msg4 matches the UE contention identifier conveyed by Msg3 whereas the value '0' is not used.

PUCCH may be the channel used in the UL by a UE for conveying control information through the uplink control information (UCI). PUCCH resources may be RRC configured per UE. Different PUCCH resources may be configured for different number of bits in the UCI. For example, for UCI with payload smaller than two bits, up to thirty-two PUCCH resources may be configured. For UCI with payload larger than two bits, up to eight PUCCH resources may be configured.

PUCCH resources may be used to convey UCI in a periodic, semi-persistent or dynamic manner. UCI may include HARQ-ACK, scheduling request (SR) or channel state information (CSI). For example, HARQ-ACK for a scheduled PDSCH may be conveyed through a PUCCH resource indicated by a PUCCH resource indicator (PRI) field in DCI. Conversely, CSI may be conveyed by a periodic PUCCH resource which is RRC configured.

For transmission of the HARQ-ACK for Msg4, a dedicated PUCCH resource has not been configured yet. For this reason, 3GPP TS 38.213 defines a table (Table 9.2.1-1 reproduced below) of PUCCH resource sets before the dedicated PUCCH resource configuration occurs with 16 different PUCCH resource sets.

TABLE 9.2.1-1

PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

This table however does not contain information of a number of PUCCH repetitions for each PUCCH resource set since PUCCH repetitions for PUCCH transmissions before RRC configuration are not supported in 3GPP Release 15 (and with later enhancements to the 5G NR standards, the concept of PUCCH repetitions is up to UE capabilities, so in some way it is optional for the UE to provide such support).

PUCCH format 0 and format 1 may be indicated to the UE for transmitting the HARQ-ACK to Msg4. Both PUCCH formats may carry up to two bits. PUCCH format 0 may occupy up to two OFDM symbols in one slot. PUCCH format 1 may occupy up to fourteen OFDM symbols in one slot. As a result, PUCCH format 1 may be the best candidate PUCCH format in case of low coverage scenarios. The reason for allowing only these two PUCCH formats limited to two bits during initial access may be that in general the UE is not known to the network, and hence the UE may not be expected to be able to provide any of the other associated information that may be carried on the PUCCH (such as SR and CSI).

Signal generation for the two PUCCH formats are described in 3GPP TS 38.211. Both formats may use low peak to average power ration (PAPR) sequences for transmission. For PUCCH format 0 the information may be conveyed via a cyclic shift of the low PAPR sequence.

For PUCCH format 1 the information may be conveyed via a binary phase shift keying (BPSK) or quadrature phase shift keying (QPSK) symbol which modulate a low PAPR sequence.

For completeness, the below text is from TS 38.211 for PUCCH format 1 sequence modulation, wherein d(0) represents the complex-valued BPSK or QPSK symbol carrying the information.

"6.3.2.4 PUCCH format 1

6.3.2.4.1 Sequence modulation

The block of bits b(0), . . . , $b(M_{bit}-1)$ shall be modulated as described in clause 5.1 using BPSK if $M_{bit}=1$ and QPSK if $M_{bit}=2$, resulting in α complex-valued symbol d(0). The complex-valued symbol d(0) shall be multiplied with a sequence $$r_{u,v}^{(\alpha,\delta)}(n)$$

according to $$y(n) = d(0) r_{u,v}^{(\alpha,\delta)}(n)$$
$$n = 0, 1, \ldots, M_{RB}^{PUCCH,1} N_{sc}^{RB} - 1$$

where $$r_{u,v}^{(\alpha,\delta)}(n)$$

is given by clause 6.3.2.2. The quantity $$M_{RB}^{PUCCH,1}$$

is given by clause 9.2.1 of [5, TS 38.213].

The block of complex-valued symbols y(0), . . . , $$y\left(M_{RB}^{PUCCH,1} N_{sc}^{RB} - 1\right)$$

shall be block-wise spread with the orthogonal sequence $w_i(m)$ according to $$z\left(m' M_{RB}^{PUCCH,1} N_{sc}^{RB} N_{SF,0}^{PUCCH,1} + m M_{RB}^{PUCCH,1} N_{sc}^{RB} + n\right) = w_i(m) y(n)$$
$$n = 0, 1, \ldots, M_{RB}^{PUCCH,1} N_{sc}^{RB} - 1$$
$$m = 0, 1, \ldots, N_{SF,m'}^{PUCCH,1} - 1$$
$$m' = \begin{cases} 0 & \text{no intra-slot frequency hopping} \\ 0, 1 & \text{intra-slot frequency hopping} \end{cases}$$

where $$N_{SF,m'}^{PUCCH,1}$$

is given by Table 6.3.2.4.1-1. Intra-slotfrequency hopping shall be assumed when the higher-layer parameter intraSlotFrequencyHopping is provided, regardless of whether the frequency-hop distance is zero or not, and interlaced mapping is not enabled, otherwise no intra-slot frequency hopping shall be assumed.

The orthogonal sequence $w_i(m)$ is given by Table 6.3.2.4.1-2 where i is the index of the orthogonal sequence to use according to clause 9.2.1 of [5, TS 38.213]. In case of a PUCCH transmission spanning multiple slots according to clause 9.2.6 of [5, TS38.213], the complex-valued symbol d(0) is repeated for the subsequent slots".

It may be noted that based on the specifications, d(0) may be repeated at each slot in case of PUCCH repetitions.

Differently, PUCCH format 0 is a purely sequence based PUCCH, wherein the information is conveyed via a cyclic shift of a low PAPR sequence as shown below from TS 38.213.

"If a UE transmits a PUCCH with HARQ-ACK information using PUCCH format 0, the UE determines values $m_0$ and $m_{CS}$ for computing a value of cyclic shift α [4, TS 38.211] where $m_0$ is provided by initialCyclicShift of PUCCH-format0 or, if initialCyclicShift is not provided, by the initial cyclic shift index as described in clause 9.2.1 and $m_{CS}$ is determined from the value of one HARQ-ACK information bit or from the values of two HARQ-ACK information bits as in Table 9.2.3-3 and Table 9.2.3-4, respectively.

TABLE 9.2.3-3

Mapping of values for one HARQ-ACK information bit to sequences for PUCCH format 0

| HARQ-ACK Value | 0 | 1 |
|---|---|---|
| Sequence cyclic shift | $m_{cs} = 0$ | $m_{cs} = 6$ |

TABLE 9.2.3-4

Mapping of values for two HARQ-ACK information bits to sequences for PUCCH format 0

| HARQ-ACK Value | {0, 0} | {0, 1} | {1, 1} | {1, 0} |
|---|---|---|---|---|
| Sequence cyclic shift | $m_{cs} = 0$ | $m_{cs} = 3$ | $m_{cs} = 6$ | $m_{cs} = 9$ |

"

It may be noted, that in case the PUCCH carries one HARQ-ACK information bit of value '1', the cyclic shift of the sequence may be given by $m_{cs}$=6.

In the context of Release 18 technical enhancement item, it is proposed in R1-2300811 that a PUSCH transmission with repetitions scheduled by DCI format 0_0 should also be supported in case the DCI format 0_0 comprises CRC scrambled by C-RNTI. The main motivation behind this proposal is that, before UE transmits the UE capability information message to the gNB, some functions that need to be determined based on the UE capability information may not be configured. Therefore, before the RRC reconfiguration, DCI formats other than 0_0 may not be used for UL scheduling. This implies that transmissions conveying the RRC setup complete message and/or the UE capability information report message should be scheduled by DCI format 0_0 with CRC scrambled by C-RNTI, which currently does not support PUSCH repetitions.

Considering that Msg1 repetitions (Rel-18 WI) and Msg3 repetitions (specified in Rel-17) are supported, the bottleneck channel for UL before RRC reconfiguration may be transmissions of the RRC setup complete message and/or the UE capability information report message.

R1-2300811 proposes reusing the same approach of Msg3 retransmission with repetitions scheduled by DCI format 0_0 with CRC scrambled by TC-RNTI for scheduling PUSCH transmissions with repetitions with DCI format 0_0 with CRC scrambled by C-RNTI before RRC reconfiguration for indicating the number of repetitions.

DCI format 0_0 may be a fallback DCI. DCI format 0_0 may have smaller payload, may be more robust and may be more relevant for scenarios with a coverage shortage. DCI format 0_0 may also be the only format that can be used during initial access before the RRC reconfiguration. Therefore, it may be reasonable to support PUSCH transmissions with repetitions scheduled by DCI format 0_0 scrambled by C-RNTI before RRC reconfiguration (i.e., PUSCH transmissions conveying the RRC setup complete message and/or the UE capability information report message).

One problem with introducing PUSCH transmissions with repetitions for PUSCH transmissions conveying the RRC setup complete message and/or the UE capability information report message may be that at that stage of the initial access the gNB has no information on UE capabilities. That is, the gNB has no information as to whether UE would support PUSCH transmissions with repetitions for PUSCH transmissions conveying the RRC setup complete message and/or the UE capability information report message.

One or more aspect of this disclosure provides a solution to this problem.

Mechanisms to allow a UE to transmit information to the BS indicating that the UE requests PUSCH transmissions with repetitions for PUSCH transmissions conveying the RRC setup complete message and/or the UE capability information report message are discussed in R1-2300811 which reads as follows.

"During initial access, a UE can request repetition transmission for PUSCH scheduled by DCI format 0_0 with CRC scrambled by C-RNTI via Msg3 PUSCH transmission.

Alternatively, using separate PRACH resources for the request can also be considered, while this would result in further PRACH partition and therefore not preferred".

Mechanism to allow a UE to transmit information to the BS indicating that the UE requests PUCCH transmissions with repetitions for PUCCH transmissions conveying the HARQ-ACK in response to Msg4 via Msg3 PUSCH transmission have been proposed in the discussion carried out for Release 18.

One or more aspect of this disclosure configure a UE to transmit, to a BS, indication of a capability or request to perform a PUSCH transmission with repetitions for a PUSCH transmission scheduled by DCI format 0_0 with CRC scrambled by C-RNTI, CS-RNTI or MCS-C-RNTI, such as PUSCH transmission conveying the RRC setup complete message (i.e. Msg5) and/or the UE capability information report message.

The indication of the capability or request to perform a PUSCH transmission with repetitions for a PUSCH transmission scheduled by DCI format 0_0 with CRC scrambled by C-RNTI, CS-RNTI or MCS-C-RNTI may be conveyed via UCI carried by the PUCCH transmitted in the response to Msg4. Hence, it will be understood that the PUSCH transmission with repetitions scheduled by DCI format 0_0 with CRC scrambled by C-RNTI, CS-RNTI or MCS-C-RNTI may be performed following completion of a four-step RACH procedure.

In an implementation, the UCI comprises the HARQ-ACK bit. The HARQ-ACK bit may be set to a value '0' to indicate the capability or request to perform a PUSCH transmission with repetitions for a PUSCH transmission with repetitions scheduled by DCI format 0_0 with CRC scrambled by C-RNTI, CS-RNTI or MCS-C-RNTI. Additionally, the HARQ-ACK bit may be set to a value '0' to indicate that the contention ID received from the BS in Msg4 matches the contention ID transmitted by the UE in Msg3.

In another implementation, the UCI comprises the HARQ-ACK bit and at least one other bit. The at least one other bit may be multiplexed with the HARQ-ACK bit.

The HARQ-ACK bit may be set to a value '1' to indicate successful reception of Msg4 and to indicate that the contention ID received from the BS in Msg4 matches the contention ID transmitted by the UE in Msg3.

The at least one other bit may set to '0' or '1' indicate the capability or request to perform a PUSCH transmission with repetitions for a PUSCH transmission with repetitions scheduled by DCI format 0_0 with CRC scrambled by C-RNTI, CS-RNTI or MCS-C-RNTI.

The at least one other bit may be omitted to indicate the absence of capability or request to perform a PUSCH transmission with repetitions for a PUSCH transmission with repetitions scheduled by DCI format 0_0 with CRC scrambled by C-RNTI, CS-RNTI or MCS-C-RNTI.

That is, the UCI may comprise two or more bits when the UE has capability or request to perform a PUSCH transmission with repetitions for a PUSCH transmission with repetitions scheduled by DCI format 0_0 with CRC scrambled by C-RNTI, CS-RNTI or MCS-C-RNTI. The UCI may comprise one bit when the UE does not have capability or does not request to perform a PUSCH transmission with repetitions for a PUSCH transmission with repetitions scheduled by DCI format 0_0 with CRC scrambled by C-RNTI, CS-RNTI or MCS-C-RNTI.

The UCI may be transmitted using a PUCCH format 1. The HARQ-ACK bit and the at least one other bit may be modulated using a specific QPSK symbol. For example, the HARQ-ACK bit and the at least one other bit may be transmitted using a QPSK symbol with a largest Euclidian distance from a BPSK symbol corresponding to a value 'one'.

The UCI may be transmitted using a PUCCH format 0. The HARQ-ACK bit and the at least one other bit may be mapped to a sequence cyclic shift. For example, the HARQ-ACK bit and the at least one other bit may be mapped to $m_{cs}=0$ or to $m_{cs}=3$ or to $m_{cs}=6$ or to $m_{cs}=9$.

In another implementation, the UCI comprises the HARQ-ACK bit. The UCI may be transmitted using a PUCCH format 0. The capability or request to perform a PUSCH transmission with repetitions for a PUSCH transmission with repetitions scheduled by DCI format 0_0 with CRC scrambled by C-RNTI, CS-RNTI or MCS-C-RNTI may be indicated using a specific sequence cyclic shift. The specific sequence cyclic shift may be different the legacy sequence cyclic shift used for conveying a HARQ-ACK bit set to value '1' (i.e. different from $m_{cs}=6$).

In another implementation, the UCI comprises the HARQ-ACK bit. The HARQ-ACK bit may be modulated into α complex-valued symbol d(0) conveyed in a physical uplink control channel transmission with repetitions. The UCI may be transmitted using a PUCCH format 1. The capability or request to perform a PUSCH transmission with repetitions for a PUSCH transmission with repetitions scheduled by DCI format 0_0 with CRC scrambled by C-RNTI, CS-RNTI or MCS-C-RNTI may be indicated using a specific pattern for the complex-valued symbol d(0). The BS may combine the repetitions to determine that the UE has capability or requests to perform a PUSCH transmission with repetitions for a PUSCH transmission with repetitions scheduled by DCI format 0_0 with CRC scrambled by C-RNTI, CS-RNTI or MCS-C-RNTI. The complex-valued symbol d(0) may comprise one bit and may be modulated using BPSK (as in Release 17). However, instead of being repeated throughout the repetitions it may follow an alternating pattern of BPSK modulated symbols [1,−1, 1,−1, . . . ]. It will be understood that other pattern could be used.

In another implementation, the UCI comprises the HARQ-ACK bit. The HARQ-ACK bit may be mapped into a specific sequence cyclic shift $m_{cs}$ conveyed in a physical uplink control channel transmission with repetitions. The UCI may be transmitted using a PUCCH format 0. The capability or request to perform a PUSCH transmission with repetitions for a PUSCH transmission with repetitions scheduled by DCI format 0_0 with CRC scrambled by C-RNTI, CS-RNTI or MCS-C-RNTI may be indicated using a specific pattern for the specific sequence cyclic shift $m_{cs}$. The BS may combine the repetitions to determine that the UE has capability or requests to perform a PUSCH transmission with repetitions for a PUSCH transmission with repetitions scheduled by DCI format 0_0 with CRC scrambled by C-RNTI, CS-RNTI or MCS-C-RNTI. The specific sequence cyclic shift $m_{cs}$ may be set equal to 6 (as in Release 17). However, instead of each PUCCH repetition being transmitted with $m_{cs}=6$, it may follow a sequence cyclic shift pattern $m_{cs}=[6, 0, 6, 0, . . . ]$.

Figure 8:
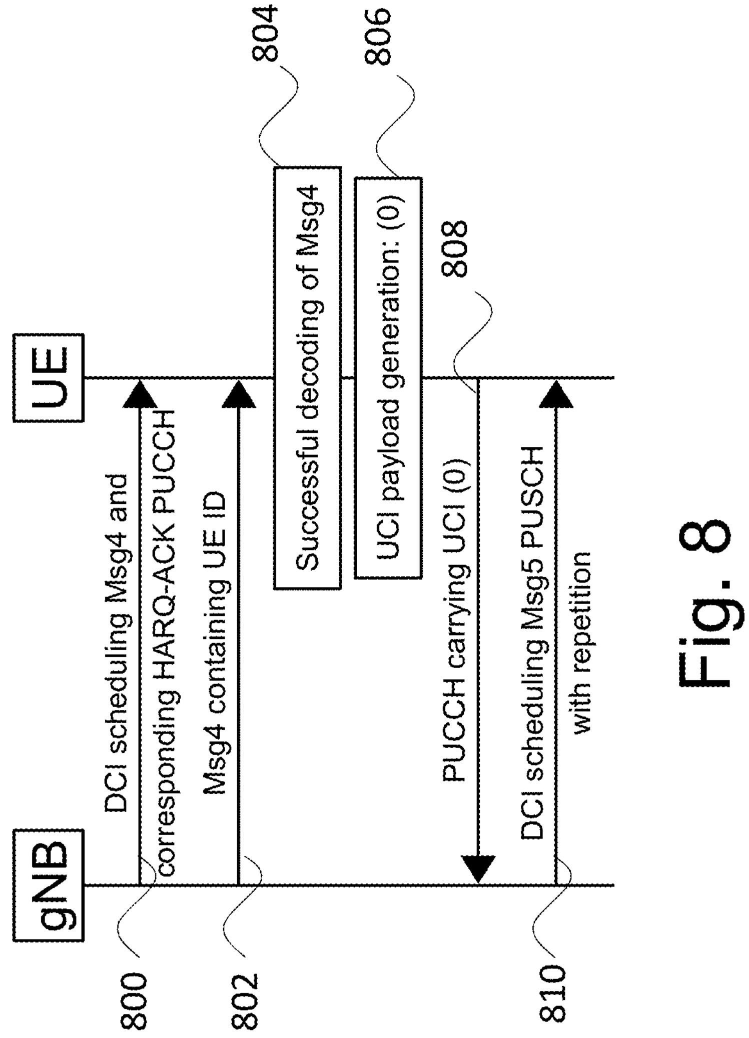
FIG. 8 shows a signalling diagram of a process for performing a physical uplink shared channel transmission with repetitions in a communication system performed by apparatus, such as a user equipment and a base station.

FIG. 8 shows a signaling diagram of a process performing a PUSCH transmission with repetitions in a communication system performed by apparatuses, such as a UE and a BS.

In step 800, the BS may transmit, to the UE, a DCI over PDCCH. The DCI may schedule Msg4 and response to Msg4.

In step 802, the BS may transmit Msg4 to the UE. MSg4 may comprise a contention resolution ID.

In step 804, the UE may successfully receive (i.e. decode) Msg4 and may determine that the contention resolution ID received from the BS in Msg4 matches a contention resolution ID transmitted by the UE to BS in Msg3. It will be understood that the transmission of contention resolution ID in Msg3 has be omitted from FIG. 8 but it may occur before step 800).

In step 806, the UE may generate a UCI indicating that the contention resolution ID received from the BS in Msg4 matches a contention resolution ID transmitted by the UE to BS in Msg3, that is successful completion of a random access procedure, and a capability or request to perform a PUSCH transmission with repetitions for a PUSCH transmission with repetitions scheduled by DCI format 0_0 with CRC scrambled by C-RNTI, CS-RNTI or MCS-C-RNTI, such as PUSCH transmission with repetitions conveying the RRC setup complete message (i.e. Msg5) and/or the UE capability information report message.

Here, the UCI comprises the HARQ-ACK bit set to a value '0' indicating that the contention ID received from the BS in Msg4 matches the contention ID transmitted by the UE in Msg3 and to indicate the capability or request to perform a PUSCH transmission with repetitions for a PUSCH transmission with repetitions scheduled by DCI format 0_0 with CRC scrambled by C-RNTI, CS-RNTI or MCS-C-RNTI.

In step 808, the UE may transmit, to the BS, the UCI over PUCCH.

In step 810, the BS may determine the capability or request to perform a PUSCH transmission with repetitions for a PUSCH transmission with repetitions scheduled by DCI format 0_0 with CRC scrambled by C-RNTI, CS-RNTI or MCS-C-RNTI. The BS may transmit, to the UE, a DCI. The DCI may schedule PUSCH transmission with repetitions conveying the RRC setup complete message (i.e. Msg5) and/or the UE capability information report message.

Figure 9:
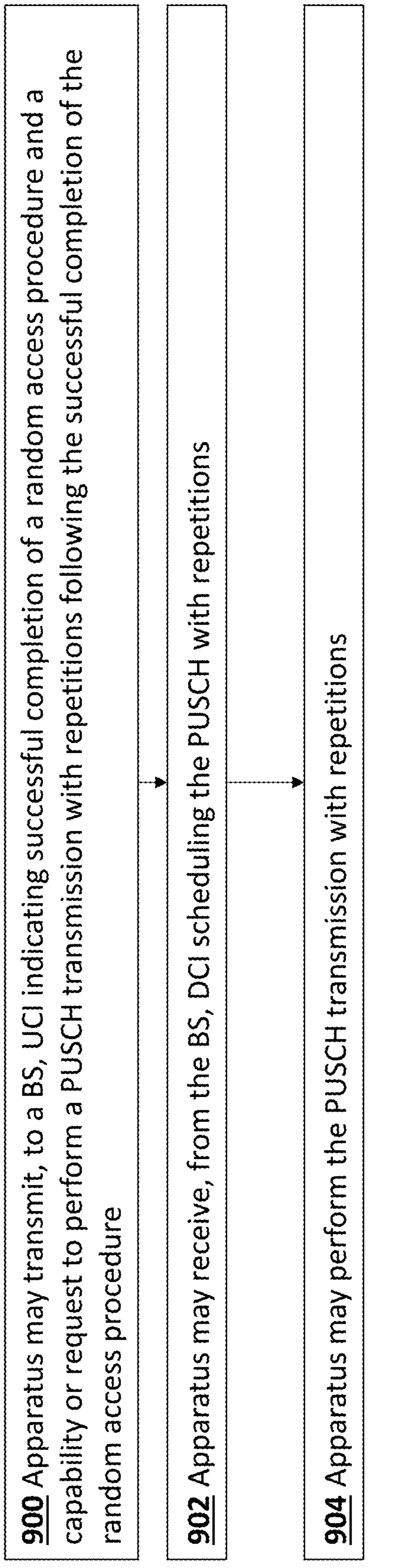
FIG. 9 shows a block diagram of a method performing a physical uplink shared channel transmission with repetitions in a communication system performed by an apparatus, such as a user equipment.

FIG. 9 shows a block diagram of a method performing a PUSCH transmission with repetitions in a communication system performed by an apparatus, such as a UE.

In step 900, the apparatus may transmit, to a BS, UCI indicating successful completion of a random access procedure and a capability or request to perform a PUSCH transmission with repetitions following the successful completion of the random access procedure.

In step 902, the apparatus may receive, from the BS, DCI scheduling the PUSCH transmission with repetitions.

In step 904, the apparatus may perform the PUSCH transmission with repetitions.

The UCI may be generated and transmitted in response to receiving, from the BS, a message 4 of a four-step random access procedure or a message B of a two-step random access procedure.

The DCO scheduling PUSCH transmission with repetitions may comprise DCI format 0_0 with a CRC scrambled by at least one of: a C-RNTI; a CS-RNTI; or a MCS-C-RNTI.

The PUSCH with repetitions may conveys at least one of: a RRC setup complete message; a capability information message; or an uplink data message.

The UCI may comprise a HARQ-ACK bit set to indicate both successful completion of the random access procedure and a capability or request to perform a PUSCH transmission with repetitions following the successful completion of the random access procedure.

The HARQ-ACK bit may be set to value 'zero'.

The UCI may be transmitted using a PUCCH format 1.

The HARQ-ACK bit may be modulated using a specific binary phase shift keying symbol.

The UCI may be transmitted using a PUCCH format 0.

The HARQ-ACK bit may be indicated using a specific sequence cyclic shift.

The UCI may comprise: a HARQ-ACK bit set to indicate a match between a contention resolution identifier received from the BS and a contention resolution identifier transmitted by the apparatus; and another bit set to indicate a capability or request to perform a PUSCH transmission with repetitions following the successful completion of the random access procedure.

The HARQ-ACK bit may be set to value 'one'.

The HARQ-ACK bit and the other bit may be multiplexed.

The UCI may be transmitted using a PUCCH format 1.

The HARQ-ACK bit and the other bit may be modulated using a specific QPSK symbol.

The HARQ-ACK bit and the other bit may be transmitted using a QPSK symbol with a largest Euclidian distance from a BPSK symbol corresponding to a value 'one'.

The uplink control information may be transmitted using a PUCCH format 0.

The hybrid automatic repeat request acknowledgement bit and the other bit may be indicated using a specific sequence cyclic shift.

The UCI may be transmitted using a PUCCH format 1 with repetitions and may comprise: a HARQ-ACK bit set to indicate a match between a contention resolution identifier received from the BS and a contention resolution identifier transmitted by the apparatus and modulated into α complex-valued symbol d(0) conveyed in a PUSCH transmission with repetitions. A capability or request to perform a PUSCH transmission with repetitions following the successful completion of the random access procedure may be indicated using a specific pattern for the complex-valued symbol d(0) throughout the physical uplink control channel transmission with repetitions.

The specific pattern for the complex-valued symbol d(0) may comprise an alternating pattern.

The UCI may be transmitted using a PUCCH format 0 with repetitions and may comprise: a HARQ-ACK bit set to indicate a match between a contention resolution identifier received from the BS and a contention resolution identifier transmitted by the apparatus and mapped into a specific sequence cyclic shift conveyed in a PUSCH transmission with repetitions; and wherein a capability or request to perform a PUSCH transmission with repetitions following the successful completion of the random access procedure may be indicated using a specific pattern for the specific sequence cyclic shift throughout the physical uplink control channel transmission with repetitions.

Scheduling PUSCH transmission with repetitions may comprise indicating a number of repetitions.

Figure 10:
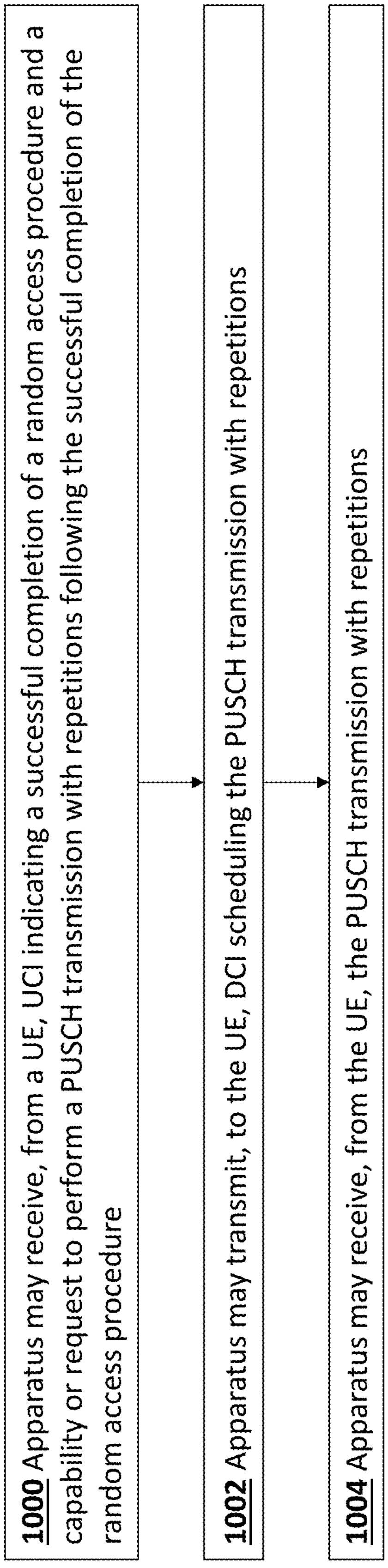
FIG. 10 shows a block diagram of a method performing a physical uplink shared channel transmission with repetitions in a communication system performed by an apparatus, such as a base station.

FIG. 10 shows a block diagram of a method performing a PUSCH transmission with repetitions in a communication system performed by an apparatus, such as a BS.

In step 1000, the apparatus receive, from a UE, UCI indicating a successful completion of a random access procedure and a capability or request to perform a PUSCH transmission with repetitions following the successful completion of the random access procedure.

In step 1002, the apparatus may transmit, to the UE, DCI scheduling the PUSCH transmission with repetitions.

In step 10004, the apparatus may receive, from the UE, the PUSCH transmission with repetitions.

The UCI may be received in response to transmitting, to the UE, a message 4 of a 4-step random access procedure or a message B of a 2-step random access procedure.

The DCI scheduling PUSCH transmission with repetitions may comprise DCI format 0_0 with a CRC scrambled by at least one of: a C-RNTI; a CS-RNTI; or a MCS-C-RNTI.

The PUSCH transmission with repetitions may convey at least one of: a RRC setup complete message; a capability information message; or an uplink data message.

Figure 11:
FIG. 11 shows a schematic representation of a non-volatile memory medium storing instructions which when executed by a processor allow a processor to perform one or more of the steps of the methods of FIG. 11.

FIG. 11 shows a schematic representation of non-volatile memory media 1100 storing instructions and/or parameters which when executed by a processor allow the processor to perform one or more of the steps of the methods of FIGS. 9 and 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 9 and 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:

a processor; and a non-transitory computer-readable medium comprising computer-executable instructions that, when executed by the processor, cause the apparatus at least to:

transmit, to a base station, uplink control information indicating successful completion of a random access procedure and a capability or request to perform a physical uplink shared channel transmission with repetitions following a successful completion of the random access procedure, wherein the uplink control information comprises:

a hybrid automatic repeat request acknowledgement bit set to indicate a match between a contention resolution identifier received from the base station and a contention resolution identifier transmitted by the apparatus, wherein the hybrid automatic repeat request acknowledgement bit is set to value 'zero'; and another bit set to indicate a capability or request to perform a physical uplink shared channel transmission with repetitions following the successful completion of the random access procedure;

receive, from the base station, downlink control information scheduling the physical uplink shared channel transmission with repetitions comprises downlink control information format 0_0 with a cyclic redundancy check scrambled by:

a cell radio network temporary identifier;

a configured scheduling radio network temporary identifier; and a modulation and coding scheme cell radio network temporary identifier; and perform the physical uplink shared channel transmission with repetitions, wherein the physical uplink shared channel transmission with repetitions conveys the following:

a radio resource control setup complete message;

a capability information message; and an uplink data message; and wherein the uplink control information is transmitted using a physical uplink control channel format 1 with repetitions and comprises:

a hybrid automatic repeat request acknowledgement bit set to indicate a match between a contention resolution identifier received from the base station and a contention resolution identifier transmitted by the apparatus and modulated into a complex-valued symbol d(0) conveyed in a physical uplink control channel transmission with repetitions; and wherein a capability or request to perform a physical uplink shared channel transmission with repetitions following the successful completion of the random access procedure is indicated using a specific pattern for the complex-valued symbol d(0) throughout the physical uplink control channel transmission with repetitions.

2. The apparatus of claim 1, wherein the uplink control information is generated and transmitted in response to receiving, from the base station, a message 4 of a four-step random access procedure or a message B of a two-step random access procedure.

3. The apparatus of claim 2, wherein the uplink control information is transmitted using a physical uplink control channel format 1.

4. The apparatus of claim 3, wherein the hybrid automatic repeat request acknowledgement bit and the other bit are modulated using a specific quadrature phase shift key symbol.

5. The apparatus of claim 4, wherein the uplink control information is transmitted using a physical uplink control channel format 0.

6. The apparatus of claim 5, wherein the hybrid automatic repeat request acknowledgement bit and the other bit may be indicated using a specific sequence cyclic shift.

7. The apparatus of claim 6, wherein the apparatus is a user equipment.

8. A system comprising:

an apparatus;

a processor; and a non-transitory computer-readable medium comprising computer-executable instructions that, when executed by the processor, cause the apparatus at least to:

transmit, to a base station, uplink control information indicating successful completion of a random access procedure and a capability or request to perform a physical uplink shared channel transmission with repetitions following the successful completion of the random access procedure, wherein the uplink control information comprises:

a hybrid automatic repeat request acknowledgement bit set to indicate a match between a contention resolution identifier received from the base station and a contention resolution identifier transmitted by the apparatus, wherein the hybrid automatic repeat request acknowledgement bit is set to value 'zero'; and another bit set to indicate a capability or request to perform a physical uplink shared channel transmission with repetitions following a successful completion of the random access procedure;

receive, from the base station, downlink control information scheduling the physical uplink shared channel transmission with repetitions comprises downlink control information format 0_0 with a cyclic redundancy check scrambled by:

a cell radio network temporary identifier;

a configured scheduling radio network temporary identifier; and a modulation and coding scheme cell radio network temporary identifier; and perform the physical uplink shared channel transmission with repetitions, wherein the physical uplink shared channel transmission with repetitions conveys the following:

a radio resource control setup complete message;

a capability information message; and an uplink data message; and wherein the uplink control information is transmitted using a physical uplink control channel format 1 with repetitions and comprises:

a hybrid automatic repeat request acknowledgement bit set to indicate a match between a contention resolution identifier received from the base station and a contention resolution identifier transmitted by the apparatus and modulated into a complex-valued symbol d(0) conveyed in a physical uplink control channel transmission with repetitions; and wherein a capability or request to perform a physical uplink shared channel transmission with repetitions following the successful completion of the random access procedure is indicated using a specific pattern for the complex-valued symbol d(0) throughout the physical uplink control channel transmission with repetitions.

9. The system of claim 8, wherein the uplink control information is generated and transmitted in response to receiving, from the base station, a message 4 of a four-step random access procedure or a message B of a two-step random access procedure.

10. The system of claim 9, wherein the uplink control information is transmitted using a physical uplink control channel format 1.

11. The system of claim 10, wherein the hybrid automatic repeat request acknowledgement bit and the other bit are modulated using a specific quadrature phase shift key symbol.

12. The system of claim 11 wherein the uplink control information is transmitted using a physical uplink control channel format 0.

13. The system of claim 12, wherein the hybrid automatic repeat request acknowledgement bit and the other bit may be indicated using a specific sequence cyclic shift.

14. The system of claim 13, wherein the apparatus is a user equipment.

15. A method comprising:

transmitting, by a user equipment to a base station, uplink control information indicating successful completion of a random access procedure and a capability or request to perform a physical uplink shared channel transmission with repetitions following the successful completion of the random access procedure, wherein the uplink control information comprises:

a hybrid automatic repeat request acknowledgement bit set to indicate a match between a contention resolution identifier received from the base station and a contention resolution identifier transmitted by the use equipment, wherein the hybrid automatic repeat request acknowledgement bit is set to value 'zero'; and another bit set to indicate a capability or request to perform a physical uplink shared channel transmission with repetitions following the successful completion of the random access procedure;

receiving, by the user equipment from the base station, downlink control information scheduling the physical uplink shared channel transmission with repetitions comprises downlink control information format 0_0 with a cyclic redundancy check scrambled by:

a cell radio network temporary identifier;

a configured scheduling radio network temporary identifier; and a modulation and coding scheme cell radio network temporary identifier; and performing, by the user equipment, the physical uplink shared channel transmission with repetitions, wherein the physical uplink shared channel transmission with repetitions conveys the following:

a radio resource control setup complete message;

a capability information message; and an uplink data message; and wherein the uplink control information is transmitted using a physical uplink control channel format 1 with repetitions and comprises:

a hybrid automatic repeat request acknowledgement bit set to indicate a match between a contention resolution identifier received from the base station and a contention resolution identifier transmitted by the user equipment and modulated into a complex-valued symbol d(0) conveyed in a physical uplink control channel transmission with repetitions; and wherein a capability or request to perform a physical uplink shared channel transmission with repetitions following the successful completion of the random access procedure is indicated using a specific pattern for the complex-valued symbol d(0) throughout the physical uplink control channel transmission with repetitions.

16. The method of claim 15, wherein the uplink control information is generated and transmitted in response to receiving, from the base station, a message 4 of a four-step random access procedure or a message B of a two-step random access procedure.

17. The method of claim 16, wherein the uplink control information is transmitted using a physical uplink control channel format 1.

18. The method of claim 17, wherein the hybrid automatic repeat request acknowledgement bit and the other bit are modulated using a specific quadrature phase shift key symbol.

19. The method of claim 18 wherein the uplink control information is transmitted using a physical uplink control channel format 0.

20. The method of claim 19, wherein the hybrid automatic repeat request acknowledgement bit and the other bit may be indicated using a specific sequence cyclic shift.

* * * * *